Patented Apr. 12, 1949

2,466,926

UNITED STATES PATENT OFFICE 2,466,926

2-ACYL-2-(β-CARBALKOXYETHYL)-CYCLOALKANONES

Herman A. Bruson, Rydal, and Harry R. Raterink, Drexel Hill, Pa., assignors, by mesne assignments, to Rohm & Haas Company, Philadelphia, Pa., a corporation of Delaware No Drawing. Application June 26, 1947, Serial No. 757,343

16 Claims. (Cl. 260—468)

This invention relates to esters of 2-acyl-2-(β-carboxyethyl)-cycloalkanones and to a method for their preparation. In particular, this method comprises the addition of an ester of acrylic acid to a 2-acyl cycloalkanone under the influence of an alkaline condensing agent.

Although it is known that acrylic acid esters react at the olefinic bond of the ester with nitroalkanes and such reactive aliphatic structures as acetoacetic esters and malonic esters, they have not been found to react with 1,3-diketones such as benzoyl acetone, 1,3-cyclohexanedione, methylene-bis-(2-cyclohexanedione-1,3), or methylene-bis-(2-hydroresorcin).

It is surprising, therefore, to find that one mole of an ester of acrylic acid reacts with one mole of a 2-acyl cycloalkanone to form esterified 2-acyl-2-(β-carboxyethyl) - cycloalkanones. The products obtained are useful as softeners and plasticizers for resinous compositions and serve as intermediates for the preparation of other new compounds. For instance, some of these cycloalkanone derivatives undergo ring opening to yield new γ-acyl dicarboxylic acids which are of considerable value not only for the preparation of esters which are superior plasticizers with such resins as vinyl chloride, vinyl acetate, the vinyl ethers, and the like, but also for the preparation of interesting new resins by reaction with polyhydric alcohols, polyamines, polyisocyanates, and the like.

The compounds provided by this invention are diketoesters having the general formula

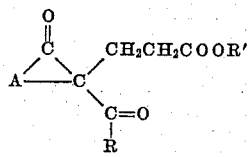

wherein A is a saturated hydrocarbon group having an alkylene chain of three to eight carbon atoms, forming a homocycle with the carbon atoms to which A is joined, R is an alkyl group of one to three carbon atoms, and R' is the saturated hydrocarbon residue of a monohydric alcohol of one to twelve carbon atoms, particularly of a saturated lower aliphatic alcohol of one to four carbon atoms.

These compounds are prepared by reacting by addition equimolecular proportions of an acrylic acid ester of the formula $CH_2=CHCOOR'$ and a 2-acyl cycloalkanone having the formula

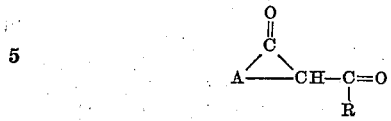

wherein A, R, and R' represent the same groups as set forth above. The reaction is effective under the influence of a small amount of an alkaline condensing agent.

Among such agents are the alkali metals themselves and their oxides, hydroxides, hydrides, amides, cyanides, and alcoholates. Specific examples of these are such strongly alkaline compounds as sodium methoxide, sodium ethylate, potassium tert.-amylate, potassium, sodium, or lithium hydroxide, sodium metal, sodium oxide, sodium hydride, and the like. There may likewise be used other strongly basic catalysts, in particular the strongly basic non-metallic hydroxides such as the quaternary ammonium hydroxides. Important examples of these are benzyl triethyl ammonium hydroxide, dibenzyl dimethyl ammonium hydroxide, and benzyl trimethyl ammonium hydroxide. These organic bases may be used in the form of relatively concentrated aqueous solutions. For example, a 40% aqueous solution of benzyl trimethyl ammonium hydroxide, as commercially available, may be used. One or several of these strongly alkaline catalysts may be suspended or, preferably, dissolved in the acyl cycloalkanone or a solution thereof in an inert liquid such as dioxane, tert.-butyl alcohol, ether, or benzene.

Only a small amount of alkaline condensing agent is required, amounts of 1% to 10% of the weight of the acyl cycloalkanone being sufficient to promote the reaction. It is desirable to test the reaction mixture during the course of the reaction to ascertain that it is alkaline. If necessary, small additional amounts of alkaline agent may be added to ensure optimum reaction conditions.

The reaction is applicable to a variety of 2-acyl cycloalkanones. The cyclic compound may be that of a 2-acylated cyclopentanone, cyclohexanone, cycloheptanone, cyclooctanone, or cyclodecanone. The acyl group may be preferably acetyl, propionyl, butyryl, or iso-butyryl. In some cases, larger acyl groups may be used, such as hexoyl or octoyl. Typical compounds serving as starting materials are 2-acetyl cyclopentanone, 2-propionyl cyclopentanone, 2-butyryl cyclopentanone, 2-acetyl cyclohexanone, 2-propionyl cyclohexanone, 2-butyryl cyclohexanone, 2-acetyl cycloheptanone, 2-propionyl cyclooctanone, 2-acetyl cyclodecanone, etc., and such acyl cycloalkanones carrying a saturated hydrocarbon substituent of one to twelve carbon atoms in positions other than that occupied by the acyl group. Such saturated hydrocarbon substituents may be one or more alkyl or cycloalkyl groups, including methyl, ethyl, butyl, cyclohexyl, methylcyclohexyl, or the like.

As acrylic esters, there may be used the esters from monohydric alcohols such as methyl, ethyl, propyl, isopropyl, butyl, isobutyl, tert.-butyl, or sec.-butyl alcohols, as a preferred class, or the various amyl, hexyl, heptyl, octyl, nonyl, decyl, or dodecyl alcohols. The alcohols used in the preparation of the acrylic esters need not be confined to these saturated aliphatic alcohols, however, and there may be used cyclohexanol, benzyl alcohol, phenylethyl alcohol, hexahydrobenzyl alcohol, methylcyclohexanol, butylcyclohexanol, or the like.

Reaction is effected between the reactants by mixing an ester of acrylic acid with a 2-acyl cycloalkanone in an approximately molecularly equivalent proportion in the presence of an alkaline condensing agent with or without an inert solvent for the reactants. Reaction by addition occurs at temperatures between 10° C. and 80° C., the highest temperature at which the reaction can be controlled being usually the temperature of choice. In cases where the reaction is highly exothermic, the reaction mixture is desirably cooled during the main part of the reaction. Temperatures may be raised to drive the reaction toward completion or accelerate otherwise sluggish reactions. Inhibitors, such as hydroquinone or β-naphthol, may be used, if desired. When the reaction has run its course, the alkaline condensing agent is desirably destroyed, as by neutralization with an acid, such as hydrochloric, sulfuric, or acetic acid. The carboxyethylated 2-acyl cycloalkanone is then purified or isolated as desired. Most of these products are distillable at low pressures and may be so separated.

The reaction may be illustrated by the reaction between 2-acetyl cyclohexanone and ethyl acrylate, as typical reactants:

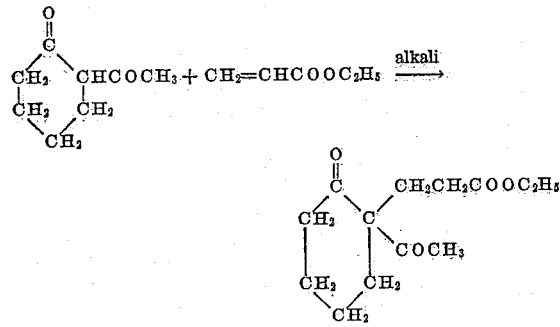

Such carboxyethyl acyl cylopentanones and cyclohexanones yield long-chained dicarboxylic acids and their derivatives as the result of ring cleavage. When these compounds are boiled with aqueous alkalies or mineral acids, they undergo a cleavage of the cyclohexanone ring to yield γ-acyl suberic or azelaic acids (or their salts), according to the following reaction:

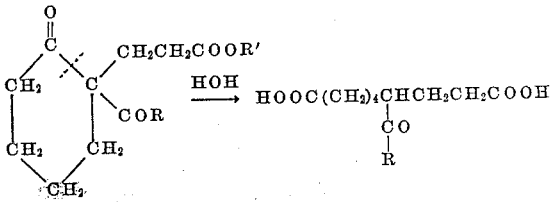

The esters of these dicarboxylic acids are exceptionally valuable and widely useful plasticizers.

Carboxyethyl acyl cycloalkanones and a method for their preparation are illustrated in the following examples:

*Example 1*

A mixture was prepared from 126 grams of 2-acetyl cyclopentanone-1 (one mole), five grams of a 40% solution of benzyl trimethyl ammonium hydroxide, and thirty-six grams of tert.-butyl alcohol. To this mixture was added eighty-six grams (one mole) of methyl acrylate. The methyl acrylate was added dropwise to the stirred acetyl cyclopentanone-tert.-butyl alcohol solution which had been made alkaline with a 40% solution of benzyl trimethyl ammonium hydroxide during the course of one and three-quarter hours. The temperature was maintained at 25°–35° C. by cooling with a water bath when necessary. The reaction mixture was left standing overnight, the solution was then made slightly acid by the addition of dilute hydrochloric acid, the organic layer and aqueous solution were separated, and the organic layer was then washed with water, separated, dried, and distilled under reduced pressure. A yield of 153 grams (72.1% of theory) of a colorless liquid, distilling at 147°–152° C./0.55 mm., was obtained. On redistillation, the product boiled at 140°–142° C./0.31–0.35 mm., had a refractive index, $n_D^{20}$, of 1.4716 and a density, $d_4^{20}$, of 1.130. By analysis, it corresponded to the composition of 2-(β-carbomethoxyethyl)-2-acetyl cyclopentanone-1, a compound having the formula:

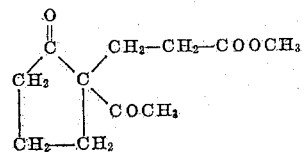

(carbon, 62.26%; hydrogen 7.60%, as compared with the theoretical values of 62.25% of carbon and 7.59% of hydrogen).

*Example 2*

A mixture was prepared from seventy-seven grams of 2-butyryl cyclopentanone-1, thirty-four grams of tert.-butyl alcohol, and five grams of benzyl trimethyl ammonium hydroxide. Twenty-five grams of ethyl acrylate was added to this mixture with, however, no indication of reaction. Therefore, five more grams of benzyl trimethyl ammonium hydroxide was added, which caused the temperature to rise, and then another twenty-five grams of ethyl acrylate was added at 30°–36° C. The reaction mixture was left standing overnight, the solution was then acidified with dilute hydrochloric acid, washed with water, and distilled. Thus, there was obtained 115 grams of a product which distilled at 127°–140° C./0.8–0.43 mm. Upon redistillation, the colorless liquid, having a boiling point of 145°–148° C./0.7–0.6 mm., a refractive index, $n_D^{20}$, of 1.4686, and a density, $d_4^{20}$, of 1.062, was collected. By analysis, it corresponded to the composition of 2-($\beta$-carboethoxyethyl)-2-butyryl cyclopentanone-1, a compound having the formula

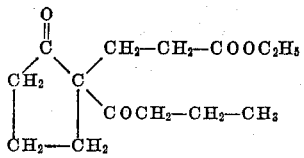

and contained 66.14% of carbon and 8.80% of hydrogen as compared with theoretical values of 66.11% of carbon and 8.72% of hydrogen.

*Example 3*

To a mixture containing seventy grams of 2-propionyl cyclopentanone-1, forty grams of tert.-butyl alcohol, and five grams of a 40% solution of benzyl trimethyl ammonium hydroxide there was added sixty-four grams of butyl acrylate during the course of three and one-half hours while the temperature was held below 35° C. by cooling. The reaction mixture was left standing overnight, whereupon the solution was acidified with dilute hydrochloric acid, washed with water, and distilled. The distillation gave 116 grams of a product (86.5% of theory) which came over at 151°–161° C./0.55–0.63 mm. Redistillation gave a colorless liquid having a boiling point of 155°–160° C./0.5 mm., a refractive index, $n_D^{20}$, of 1.4675, and a density, $d_4^{20}$, of 1.047. By analysis, it corresponded to the composition of 2-($\beta$-carbobutoxyethyl)-2-propionyl cyclopentanone-1, a compound having the formula

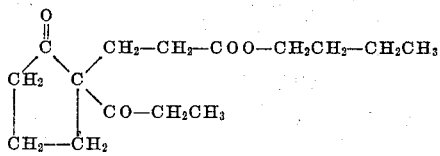

and contained 67.22% of carbon and 9.07% of hydrogen as compared with theoretical values of 67.14% and 9.01%, respectively.

*Example 4*

A mixture was prepared from seventy grams of 2-acetyl cyclohexanone-1, fifty grams of tert.-butyl alcohol, and 2.5 grams of a 40% solution of benzyl trimethyl ammonium hydroxide. To this solution there was added forty-three grams of methyl acrylate during the course of five minutes. This reaction was exothermic, and cooling was necessary for some time to keep the temperature at approximately 40° C. The reaction mixture was left standing for two days. The product was then acidified with dilute hydrochloric acid, washed, and distilled. There was thus obtained eighty-six grams of a product (72.9% of theory) which distilled at 127°–143° C./1 mm. Upon redistillation, the product was collected as a colorless liquid having a boiling point of 128°–131° C./1 mm., a refractive index, $n_D^{25}$, of 1.4768, and a density, $d_4^{25}$, of 1.1233. By analysis is corresponded to the composition of 2-($\beta$-carbomethoxyethyl)-2-acetyl cyclohexanone-1, a compound of the formula

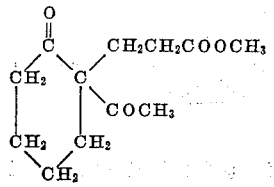

and contained 63.90% of carbon and 8.32% of hydrogen as compared with theory of 63.71% carbon and 8.03% hydrogen.

*Example 5*

After a mixture had been prepared from seventy-seven grams of 2-propionyl cyclohexanone-1 (0.5 mole), fifty grams of tert.-butyl alcohol, and 2.5 grams of a 40% solution of benzyl trimethyl ammonium hydroxide, sixty-four grams (0.5 mole) of butyl acrylate was added during the course of 35 minutes at a temperature of 30°–35° C. The reaction was somewhat exothermic, and occasional cooling was necessary. After the mixture was allowed to stand overnight, the solution was made slightly acid with dilute hydrochloric acid and was distilled under reduced pressure. The product distilled as a pale yellow liquid in a yield of 101 grams (71.6% of theory), had a boiling point of 160°–163° C./1 mm., a refractive index, $n_D^{25}$, of 1.4731, and a density, $d_4^{25}$, of 1.058. By analysis, it corresponded to 2-($\beta$-carbobutoxyethyl)-2-propionyl cyclohexanone-1, a compound having the formula.

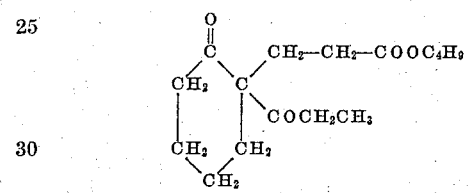

*Example 6*

To a mixture prepared from fifty grams of 2-acetyl cycloheptanone, twenty-five grams of tert.-butyl alcohol, and two grams of a 40% solution of benzyl trimethyl ammonium hydroxide there was added in approximately thirty minutes 20.6 grams of methyl acrylate at a temperature of 32°–37° C. The reaction was exothermic, and occasional cooling was necessary. The reaction mixture was left standing overnight, after which the solution was acidified with hydrochloric acid, washed with water, and distilled. The product was collected as a pale yellow liquid, in a yield of twenty-seven grams (46.8% theory), which boiled at 154°–161° C./2 mm., had a refractive index, $n_D^{25}$, of 1.4806, and a density, $d_4^{25}$, of 1.113. By analysis, it corresponded to the composition of 2-($\beta$-carbomethoxyethyl)-2-acetyl cycloheptanone-1, a compound of the formula

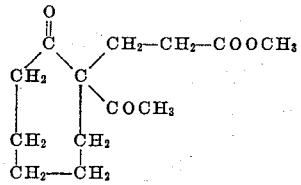

and contained 65.17% of carbon and 8.52% of hydrogen as compared with theoretical values of 64.96% and 8.39%, respectively.

*Example 7*

A mixture was prepared from eighty-three grams of 2-butyryl cyclohexanone-1 (0.5 mole), fifty grams of tert.-butyl alcohol, and ten grams of a 40% solution of benzyl trimethyl ammonium hydroxide. Fifty grams of ethyl acrylate was added to this mixture during the course of fifteen minutes at 38°–39° C. There was no apparent heat of reaction; hence the solution was heated for six hours at 70°–75° C. and left standing for two days at approximately room temperature. The solution was then acidified with hydrochloric acid and distilled. The product was obtained as a pale yellow liquid, having distilled at 145°–152° C./1 mm., in a yield of seventy-eight grams. Upon redistillation, the product distilled as a pale yellow liquid at 145°–146° C./1 mm. By analysis, it corresponded to the composition of 2-(β-carboethoxyethyl)-2-butryl cyclohexanone-1, a compound of the formula

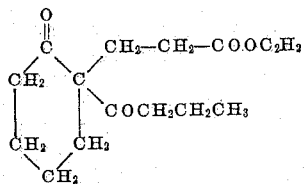

By the procedures illustrated above, there may be prepared any of the carboxyethyl acyl cycloalkanones in which the acyl group is acetyl, propionyl, or butyryl, or even larger. While the acrylic ester used is preferably one from a saturated aliphatic monohydric alcohol of one to four carbon atoms to form 2-acyl-2-(β-carbalkoxyethyl) cycloalkanones having an alkyl ester group of one to four carbon atoms, the reaction may be effected with esters having larger and more complex residues from other alcohols. Insofar as the new cyclic compounds are desired for conversion by ring splitting to dicarboxylic acids, it is not economical to use acrylic esters with large alcohol residues unless it is desired to use an acrylic ester of high boiling point so that the reaction temperature may conveniently be raised. This may be advantageous when the acyl substituent is so large as to cause the addition reaction with the ester to be sluggish, as in the case of 2-octanoyl cycloalkanones. Particularly useful under these conditions are hexyl acrylate, octyl acrylate, or dodecyl acrylate.

We claim:

1. A method for preparing compounds of the formula

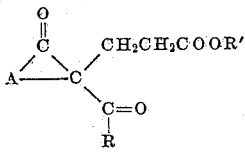

wherein A is a divalent saturated hydrocarbon group having an alkylene chain of three to five carbon atoms forming a homocycle with the carbon atoms to which A is joined, R is an alkyl group of not over three carbon atoms, and R' is the hydrocarbon residue of a saturated monohydric alcohol of not over twelve carbon atoms, which comprises reacting by addition in the presence of a small amount of an alkaline condensing agent substantially equimolecular proportions of an acrylic acid ester, CH₂=CHCOOR', and a 2-acyl cycloalkanone of the formula

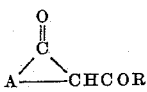

wherein R', A, and R have the meanings defined above.

2. A method for preparing compounds of the formula

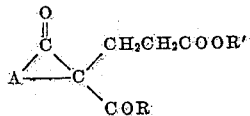

wherein A is a divalent saturated hydrocarbon group having an alkylene chain of three to five carbon atoms forming a homocycle with the carbon atoms to which A is joined, R is an alkyl group of not over three carbon atoms, and R' is the hydrocarbon residue of a saturated aliphatic monohydric alcohol of not over four carbon atoms, which comprises reacting by addition in the presence of a small amount of an alkaline condensing agent one mole of an acrylic ester,

CH₂=CHCOOR', and one mole of a 2-acyl cycloalkanone of the formula

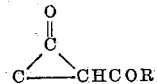

wherein R', A, and R have the meanings defined above.

3. The method of claim 2 wherein the alkaline condensing agent is a strongly alkaline quaternary ammonium hydroxide.

4. A method of preparing 2-acyl-2-(β-carbalkoxyethyl)-cyclohexanones which comprises reacting by addition in the presence of a small amount of an alkaline condensing agent one mole of an acrylic acid ester of the formula CH₂=CHCOOR', wherein R' is an alkyl group of not over four carbon atoms, with one mole of a 2-acyl cyclohexanone in which the acyl group, RCO, has an alkyl group, R, of not over three carbon atoms.

5. A method of preparing 2-acyl-2-(β-carbalkoxyethyl)-cyclohexanones which comprises reacting by addition between 10° and 80° C. in the presence of a strongly alkaline catalyst one mole of an acrylic ester of the formula

CH₂=CHCOOR', wherein R' is an alkyl group of not over four carbon atoms, and one mole of an acyl cyclohexanone of the formula

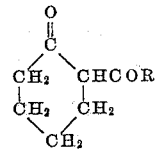

wherein R is an alkyl group of not over three carbon atoms.

6. A method of preparing 2-acetyl-2-β-carbalkoxyethyl)-cyclohexanones which comprises reacting by addition between 10° and 80° C. in the presence of a strongly alkaline catalyst and in the presence of a ninert organic solvent one mole of an acrylic ester of the formula CH₂=CHCOOR', wherein R' is an alkyl group of not over four carbon atoms, and one mole of 2-acetyl cyclohexanone.

7. The process of claim 6 wherein the acrylic ester is methyl acrylate.

8. The process of claim 6 wherein the acrylic ester is ethyl acrylate.

9. The process of claim 6 wherein the acrylic ester is butyl acrylate.

10. As a new chemical compound, a compound of the formula

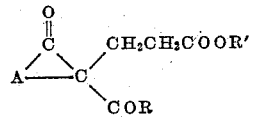

wherein A is a divalent saturated hydrocarbon group having a chain of three to five carbon atoms forming a homocycle with the carbon atoms to which the group A is joined, R is an alkyl group of not over three carbon atoms, and R' is an alkyl group of not over twelve carbon atoms.

11. As a new chemical compound, a compound of the formula

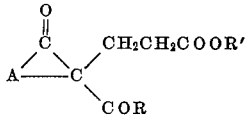

wherein A is a divalent saturated hydrocarbon group having a chain of three to five carbon atoms forming a homocycle with the carbon atoms to which the group A is joined, R is an alkyl group of not over three carbon atoms, and R' is an alkyl group of not over four carbon atoms.

12. As a new chemical compound, a compound of the formula

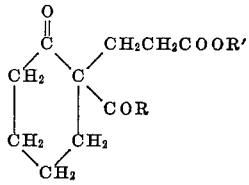

wherein R is an alkyl group of not over three carbon atoms and R' is an alkyl group of not over four carbon atoms.

13. As a new chemical compound, a compound of the formula

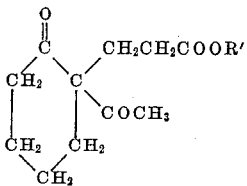

wherein R' is an alkyl group of not over four carbon atoms.

14. As a new chemical compound, 2-acetyl-2-($\beta$-carbomethoxyethyl)-cyclohexanone.

15. As a new chemical compound, 2-acetyl-2-($\beta$-carbethoxyethyl)-cyclohexanone.

16. As a new chemical compound, 2-acetyl-2-($\beta$-carbobutoxyethyl)-cyclohexanone.

HERMAN A. BRUSON.
HARRY R. RATERINK.

REFERENCES CITED

The following references are of record in the file of this patent:

UNITED STATES PATENTS

| Number | Name | Date |
|---|---|---|
| 2,264,354 | Alder et al. | Dec. 2, 1941 |